United States Patent
Corbin et al.

(10) Patent No.: US 7,188,305 B1
(45) Date of Patent: Mar. 6, 2007

(54) METHOD AND APPARATUS FOR PROVIDING LOCAL DATA PERSISTENCE FOR WEB APPLICATIONS

(75) Inventors: George E. Corbin, Hyde Park, NY (US); Joseph A. Kardash, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 09/652,065

(22) Filed: Aug. 31, 2000

(51) Int. Cl.
*G06F 17/00* (2006.01)
*G06F 17/30* (2006.01)

(52) U.S. Cl. .................. 715/505; 715/507; 715/513; 707/200

(58) Field of Classification Search ............ 715/501.1, 715/507, 505, 513; 345/745, 744, 749; 707/200, 707/100
See application file for complete search history.

(56) References Cited

U.S. PATENT DOCUMENTS

| | | | |
|---|---|---|---|
| 5,884,312 A | 3/1999 | Dustan et al. ........... | 707/10 |
| 5,987,506 A | 11/1999 | Carter et al. ........... | 709/213 |
| 5,991,878 A | 11/1999 | McDonough et al. ...... | 713/200 |
| 6,490,601 B1* | 12/2002 | Markus et al. ........... | 715/507 |
| 6,589,290 B1* | 7/2003 | Maxwell et al. ........... | 715/507 |
| 6,651,217 B1* | 11/2003 | Kennedy et al. ........... | 715/507 |

OTHER PUBLICATIONS http://www.webreference.com/js/column24/ "Persistence", created Aug. 28, 1998, pp. 1-39.*
An OS/390 Newsletter for Release dated Aug. 8, 1999 (published Sep. 1, 1999), 15 pages.
http://www.webreference.com/js/column24/benefits.html, entitled "Persistence's Benefits", created Aug. 28, 1998, pp. 1-2.
http://developer.netscape.com/docs/manuals/communicatior/jsguide4/getstart.html, Chapter 1, Getting Started, Copyright 1997, pp. 1-17.

* cited by examiner

*Primary Examiner*—Stephen Hong
*Assistant Examiner*—Adam L Basehoar
(74) *Attorney, Agent, or Firm*—William A. Kinnaman, Jr.

(57) ABSTRACT

A method and apparatus for providing local data persistence for a Web server application. A Web page provided to a client application (e.g., a Web browser) by the server application contains a data entry area as well as a save button and a restore button. When the user actuates the save button, the Web page dynamically creates a new page that contains the data to be saved and a message prompting the user to save the new page in a user-designated location by using the file-saving function of the Web browser. The user may then close the original Web page, and the new page will remain saved locally. The user may then return to the original Web page and actuate the restore button to repopulate the original Web page with the data that has been saved locally. The save page contains a script function which becomes active when the page is loaded to perform the desired restoration function.

17 Claims, 6 Drawing Sheets

SAVE DOCUMENT

LOAD DOCUMENT

METHOD AND APPARATUS FOR PROVIDING LOCAL DATA PERSISTENCE FOR WEB APPLICATIONS

REFERENCE TO COMPUTER PROGRAMMING LISTING APPENDICES

The file of this patent includes two identical compact discs, each containing computer program listings (Appendix A–F) which are incorporated herein by reference in their entirety. Each compact disc contains the single file POU92000026US1 Appendices.txt, created on Dec. 4, 2006, at 4:13:36 p.m., and having a size of 46.8 KB (47,991 bytes).

These computer program listings contain material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to a method and apparatus for providing local data persistence for Web applications.

2. Description of the Related Art

Applications based upon markup languages such as HTML (Hypertext Markup Language) are notoriously well known in the art. In a typical configuration, a user at a client node accesses an HTML document at a server node by having an HTML client application at the client node issue a request to an HTML server application at the server node. Upon receiving such a request, the HTML server at the server node retrieves the requested document and transmits it to the HTML client at the client node. Typically, the client application is a Web browser on the user's personal workstation, while the server application is a Web server at a distant node. Typically, too, the client and the server communicate with each other over a network such as the Internet using a communication protocol such as Transmission Control Protocol/Internet Protocol (TCP/IP). In addition to containing text or graphics for display, an HTML document may contain areas for entry of data by the user, ultimately to be processed on either the client or the server.

A Web application (i.e., an HTML page containing functionality for user data entry) containing potentially secure information needs data persistence to avoid losing the user's data between invocations. One current industry solution for retaining data is JavaScript "cookies", defined in *Teach Yourself Java Script in a Week* (copyright 1996 by Sam.net Publishing) as "a method of storing information locally in the browser and sending it to the server whenever the appropriate pages are requested by the user". Cookies, however, have significant limitations for Web applications that must store data on the client side. Cookies are limited in size (4096 bytes) and the number of entries per domain (20 per cookie file). Also, cookies are not secure because other sites access the same cookie file.

A typical industry solution to storing potentially large amounts of potentially secure data is to use a Common Gateway Interface (CGI) on the server and store the data on a database maintained by the server. This has limitations and complications. The Web site administrator must maintain a list of usernames and passwords to provide security to the individual files. If Secure Sockets Layer (SSL) is not implemented, this is not a very secure method because the data must be transported across the Web while not encrypted.

Another approach (for Microsoft Internet Explorer only) has been a behavior called "userData". This is a function that can save the data in a proprietary format on the computer for retrieval at a later date. However, this solution has several pitfalls. The data is no longer portable, since if the user saves a page on his or her work computer, he or she cannot transport this data to a home computer for later retrieval. Also, this approach is limited to use with the Microsoft Internet Explorer 5.x Web browser, and cannot be used with other browsers such as Netscape Navigator.

SUMMARY OF THE INVENTION

The present invention provides a method for preserving program state data across invocations of a Web browser without the use of cookies, and with the additional benefit of giving users direct control over the disposition of their data.

In accordance with the invention, a Web application dynamically creates a new Web page containing a script function that, when loaded, restores all of the current data to the application. The dynamically created page is then saved locally by the user, using the standard File/Save As function of the client application. Upon return to the Web application, the user is prompted for the location of the saved file. When that location is entered, the page is automatically loaded, the script function run, and the application is returned to the state in which it was left.

As is well known to those skilled in the art, scripting languages such as JavaScript are interpreted language that is used to generate scripts in HTML files that are delimited by <SCRIPT> and </SCRIPT> tags. When an HTML browser encounters such a script in an HTML document that it is processing, the browser executes the statements contained in the script. The present invention uses script functions in the HTML documents making up a Web application to perform the desired operations of saving, restoring and the like.

More particularly, after a user completes a portion or all of the tasks in task panels, he or she can then choose to save the data to a location accessible from the workstation (e.g., a diskette, a zip disk, local hard drive, or a network drive). The data is saved in a file that is generated using the JavaScript interpreter function of the browser. The saved file is an HTML file containing a JavaScript restoration function and the field values the user entered, which are embedded in the script commands. The file is saved using a method similar to that for saving a file in an ordinary client application. The user utilizes the Web browser's ability to perform a "Save As" operation. This saves the dynamically created HTML file. Upon reentry into the tool at some later date the user is prompted for this file. If it exists the user may load the data from the saved file into the tool. This file may be transported via any normal file transfer method (e.g., a diskette, File Transfer Protocol (FTP), etc.) and used at other workstations using the supported browser and having a connection to the Internet Web server that holds the application.

All data gathered stays on the client running the Web browser unless the user explicitly creates the data file and moves it via methods mentioned above. The user has complete control over where their data resides and what is done with it.

The present invention avoids the limitations of the prior art discussed above. The problem of data persistence is solved by saving the data locally. The 4096-byte size limit of cookies is eliminated; the only practical size limit is the memory limit for script functions such as JavaScript (which is almost limitless). The security issues are solved because the user has full control over the location of the data; the user may put it on a removable disk and store it in a secure location (such as a locked desk) if he or she wants. No other Web page has any access to local files, so the security fears of cookies are eliminated. There is no limit on the number of files that a user can save from a particular domain; the user can save as many different files as he or she chooses to and use them on another computer if desired.

Another advantage of the present invention is that to run the Web application, one need not depend on constant or speedy access to the Web. Since the present invention is not in any way tied to the server, it can be used in a disconnected mode from the Web server, and the whole package can be zipped up, downloaded and run locally on any computer by simply pointing a browser at it. Basically, this allows the whole of the application to reside on a disk which is locally accessible to the workstation, and the user can still save the data into the data file. That is to say, the application might reside on a CD and the user may use a laptop to run the tool. All on-line security or performance concerns are instantly eliminated because of this. To the knowledge of the inventors, this functionality has not been previously possible without actually installing an application on the client.

DESCRIPTION OF THE PREFERRED EMBODIMENT

Figure 1:
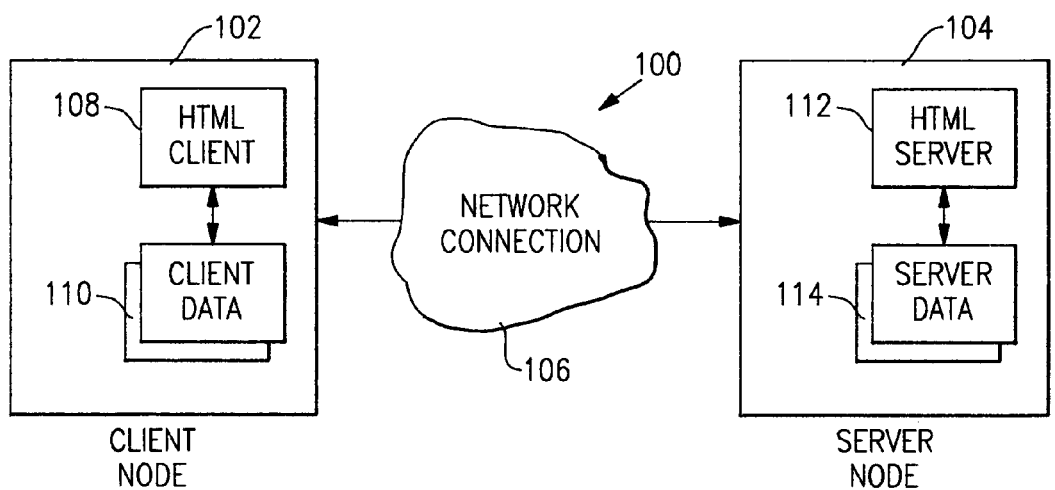
FIG. 1 shows a connected network configuration in which the present invention may be used.

FIG. 1 shows one embodiment of the present invention in a network or connected configuration. As shown in the figure, a client/server system 100 comprises a client node 102 coupled to a server node 104 via a network connection 106.

Client node 102 may comprise any suitable personal workstation, such as an Intel-architecture machine running a version of the Microsoft Windows operating system (not separately shown); however, the platform choice is not critical. Executing on client node 102 is an HTML client 108 of any suitable type, such as Netscape Navigator or Microsoft Internet Explorer Web browser. Client node 102 also contains persistent storage for storing client data (in this instance, client-managed pages) 110 in a manner to be described.

HTML client 108 is JavaScript-enabled in the sense that not only can it read and display ordinary HTML files, but it can also interpret any JavaScript function contained in an HTML file being processed.

Similarly, server node 104 may comprise any suitable server system, such as an IBM or Sun Microsystems server, running any suitable operating system (not separately shown) such as Linux or some other version of the UNIX operating system. Executing on server node 104 is an HTML server 112 of any suitable type, such as the Apache Web server or the like. Server node 104 stores server data 114 comprising one or more Web pages thereon, comprising text or graphics, embedded applications, and the like.

Network connection 106 may comprise a public network such as the Internet, a private network such as a corporate intranet, or a network combining certain aspects of public and private networks, such as a virtual private network (VPN). The network connection 106 may be implemented in any suitable manner, such as a dialup connection, a local area network (LAN) connected to a wide area network (WAN) via a gateway, or the like.

In a manner well known in the art, as described in such publications as L. Aronson and J. Lowery, *HTML 3.2 Manual of Style* (1997), at pages 1–7, a user at the client node 102 accesses a Web page at the server node 104 by having the HTML client 108 issue a request over the network connection 106 containing the Internet address of the server node 104 and the directory location of the page being requested. Upon receiving such a request over the network connection 106, the HTML server 112 at server node 104 retrieves the requested page and forwards it to the HTML client at client node 102.

Figure 2:
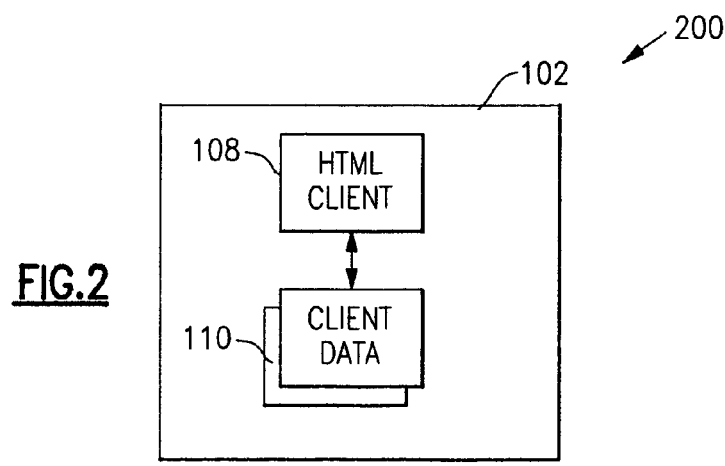
FIG. 2 shows a disconnected "island" configuration in which the present invention may be used.

In the system 100 shown in FIG. 1, the HTML client 108 and the HTML server 112 reside at different nodes. While this is the customary configuration, it is not the only possible configuration. For example, one may dispense with the server node 104 and manage all data, including Web pages ordinarily stored at the server node, as client data 110 in a disconnected "island" configuration 200 as shown in FIG. 2.

A Web application that implements this invention would typically function as follows. When a user wants to save data for a current session with the application, he or she clicks a "Save" button. The application dynamically creates a new file. This file contains a JavaScript function that is loaded whenever the user returns to the browser session. Once this page is created, the user is prompted to save the page locally. The user must manually perform this step because JavaScript itself is restricted from directly accessing the user's hard drive.

On returning to the application, the user is prompted for the location of the saved file. The user enters the location, and the application loads the file and runs its function. The application resumes at the state in which the user left it, with all previous data and at the same point in the process.

Figure 3:
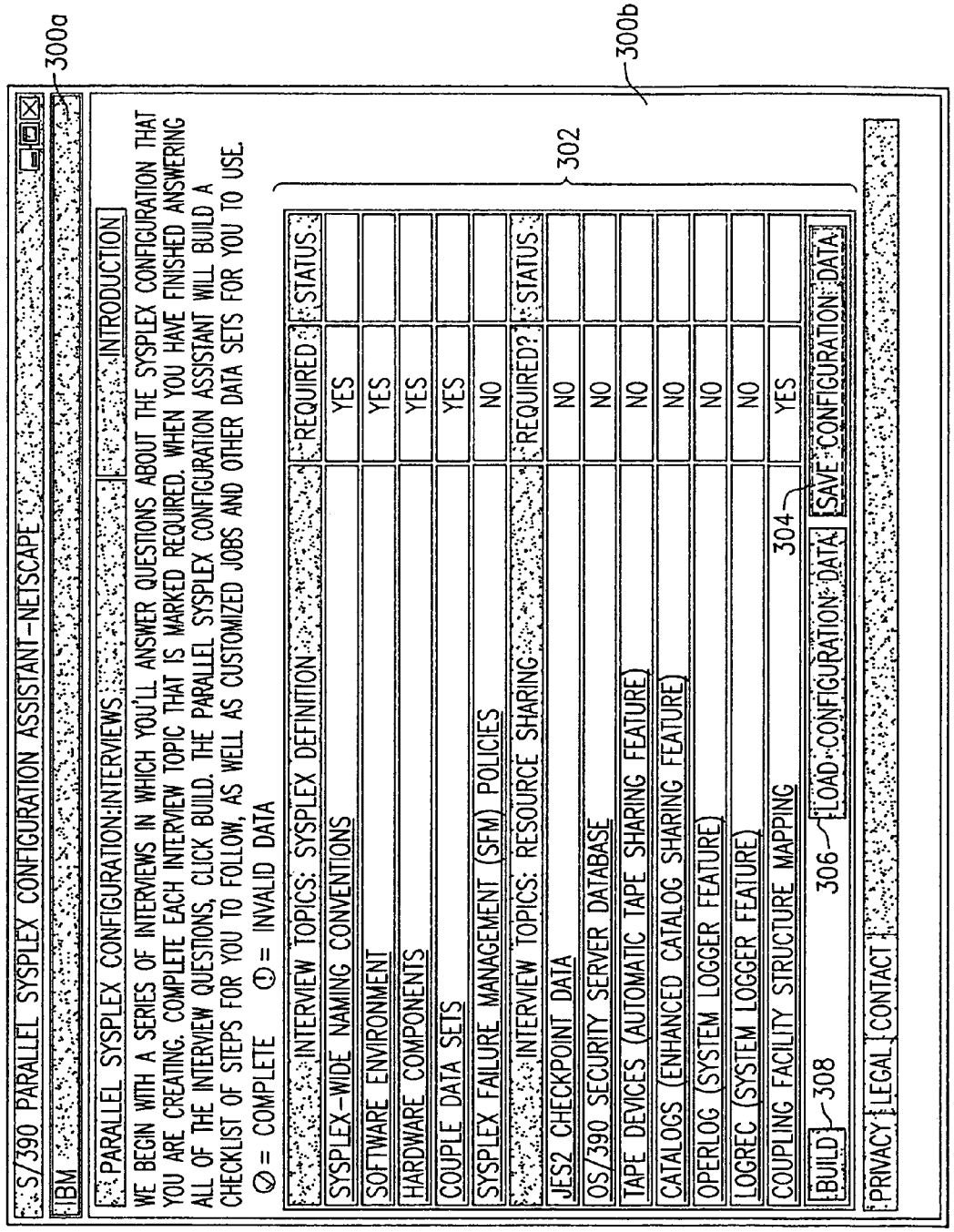
FIG. 3 shows a data entry window that is displayed in one embodiment of the present invention.

FIG. 3 shows a data entry 300 window that is displayed to the user of the HTML client 108 in one embodiment of the present invention. Data entry window 300 comprises a header frame 300a and a base frame 300b. Header 302a is a persistent frame that is used while a session is active to hold (but not display) data that is entered by the user. Base frame 302b is the frame where the data is gathered from the user and where all output is displayed. The user traverses the Web pages within the application 900 using this frame.

As shown in the figure, the base frame 300b of data entry window 300 contains a data entry area 302 as well as a "save" button 304, a "load" button 306 and a "build" button 308. The user navigates to various lines of the data entry area 302 to enter data (in this case, sysplex configuration data). When the user wants to save previously entered data, he or she actuates the save button 304 (as by clicking on it with a mouse), resulting in the display of a "save" window 400 shown in FIG. 4. Similarly, if the user wants to load previously saved data, he or she actuates the load button 306, resulting in the display of a "load" window 500 shown in FIG. 5. Finally, when the user has finished entering data, he or she may actuate a "build" button 308 to have the data processed by the Web application.

Figure 4:
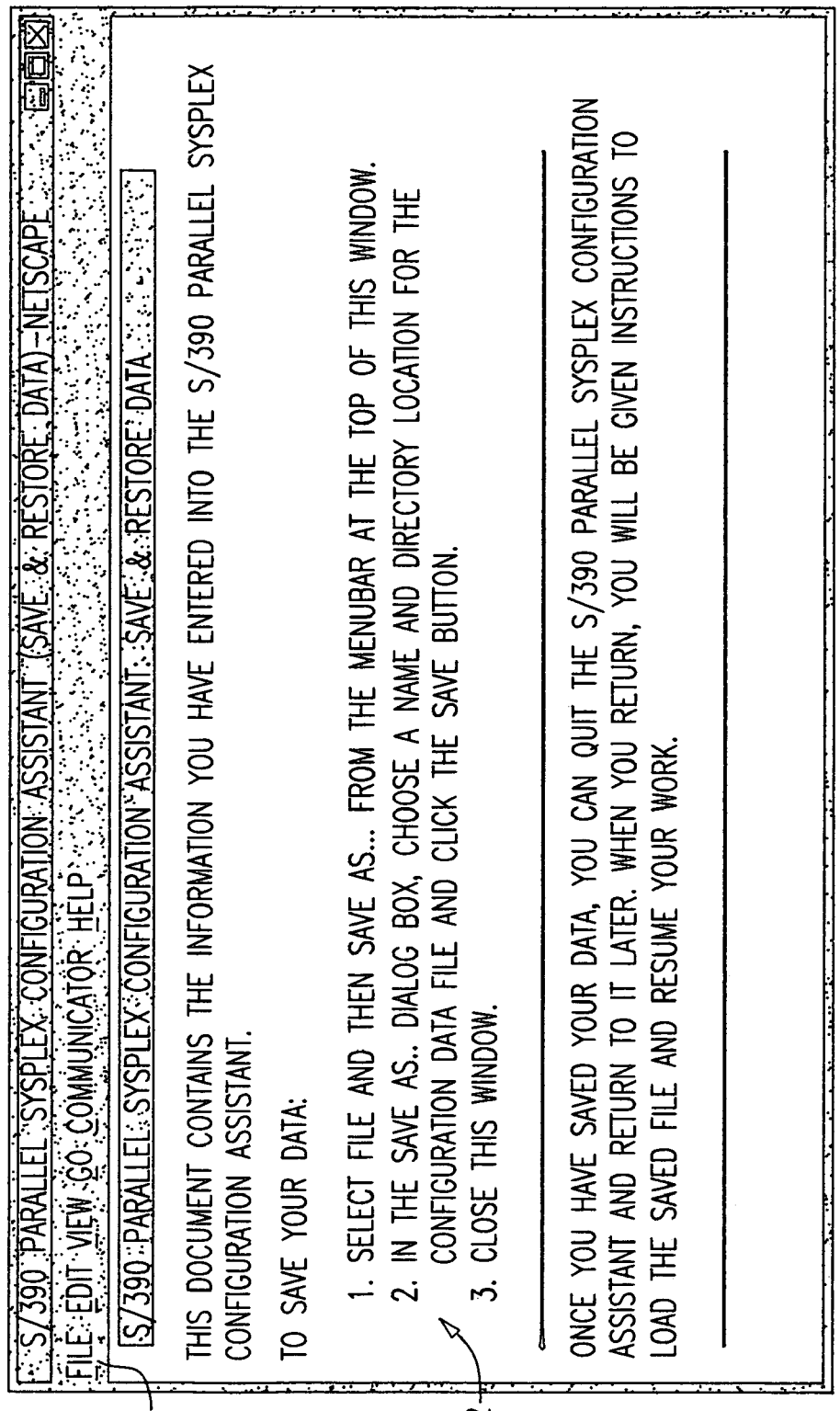
FIG. 4 shows a "save" window that is displayed when the user actuates the save button of the data entry window shown in FIG. 3.

FIG. 4 shows the save window 400 that is displayed when the user actuates the save button 304 in the data entry window 300. Save window 400 contains a text message 402 that prompts the user to save the previously entered data locally, such as by selecting "File" on the toolbar 404, then selecting "Save As" on the drop-down menu that then appears, and entering the requested filename and path information. The "Save As" function is a standard function of HTML clients 108 such as Netscape Navigator and Microsoft Internet Explorer and therefore will not be described further in this specification.

Figure 5:
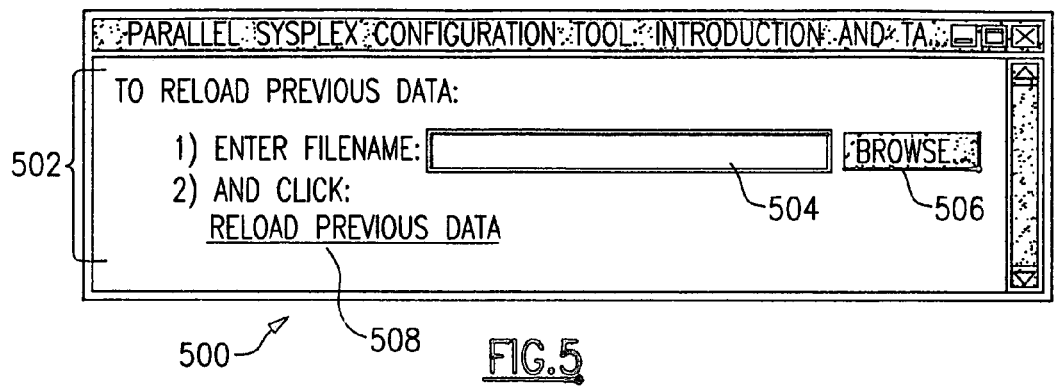
FIG. 5 shows a "load" window that is displayed when the user actuates the load button of the data entry window shown in FIG. 3.

FIG. 5 shows the load window 500 that is displayed when the user actuates the load button 306 in the data entry window 300. Load window 500 displays a text message 502 requesting the user to enter the name of the saved file in an area 504, possibly with the assistance of a "browse" button 506 if the user does not remember the filename or if it is stored in a different directory. The user then clicks on a "Reload Previous Data" link 508 to reload the previously saved data.

Figure 9:
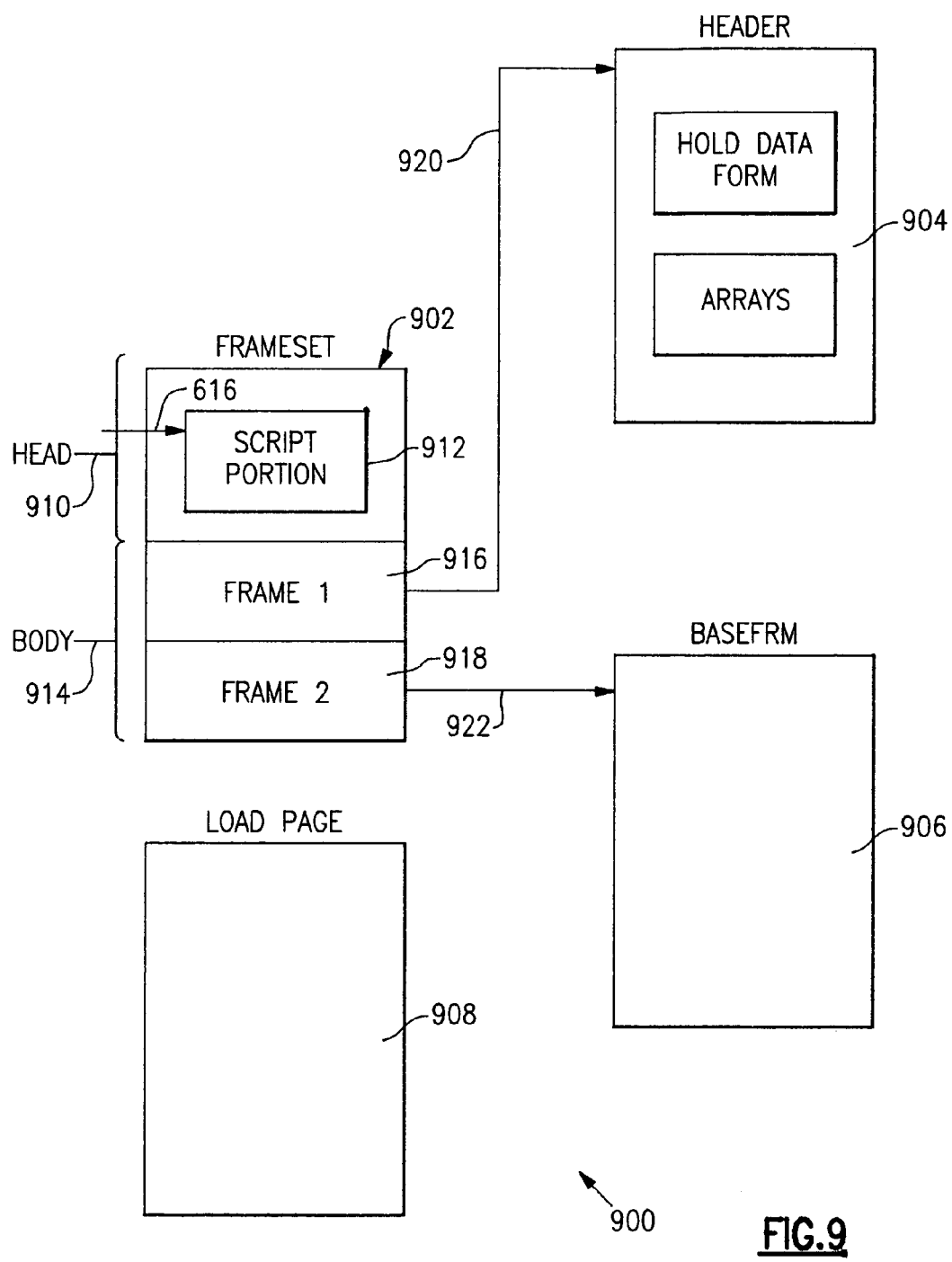
FIG. 9 shows the interrelationship among the various documents collectively making up the Web application of the present invention.

FIG. 9 shows the interrelationship among the various documents collectively making up the Web application 900 of the present invention. These include a frameset document 902, a header document 904, a base frame document 906, and a load document 908. Each of these documents is a separate HTML file. Frameset document 902 contains a head 910 that contains a script portion 912 and a body 914 that contains a first frame portion 916 and a second frame portion 918. Frame portions 916 and 918 define the boundaries of the displayed frames 300a and 300b of data entry window and contain references 920 and 922 to header file 904 and to base frame file 906, respectively, which contain the actual content of the frames. In addition to generating the display of the header 300a, header file 904 holds all the application data that is entered by the user in a form named "holddata" and in various arrays. Header file 904 only holds this data while the Web application is open and the user is interacting with it; for persistent storage of user data, the method of the present invention is used.

Figure 6:
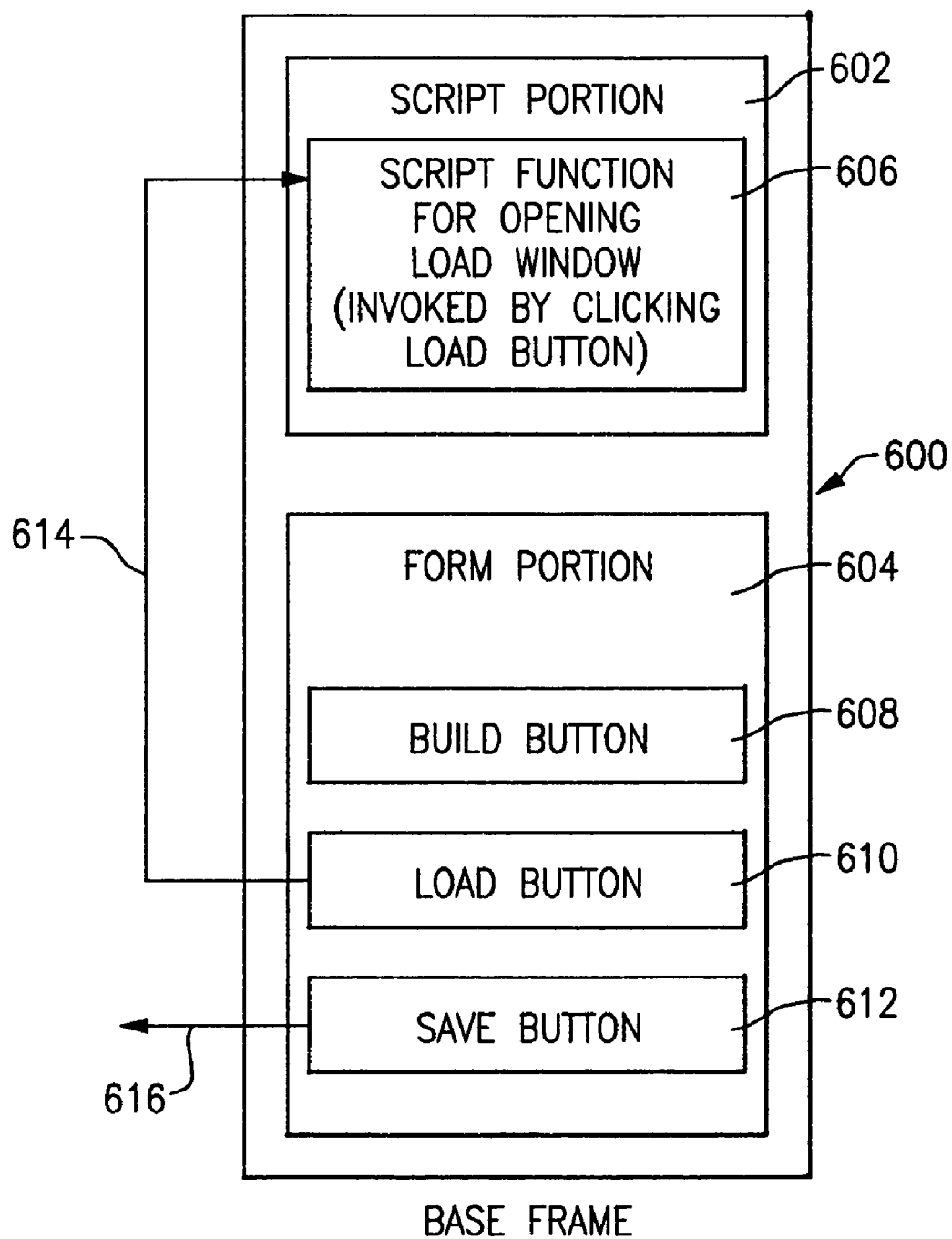
FIG. 6 shows the structure of the source version of the data entry window shown in FIG. 3.

FIG. 6 shows the general structure of the base frame document 906 that is displayed as the base frame 300b of the data entry window 300. As shown in the figure, the base frame document 906 comprises a script portion 602 and a form portion 604. Script portion 602 in turn contains a JavaScript function 606 for opening the load window 500. Form portion 604 contains, among other elements for eliciting user data, a build button portion 608 from which build button 308 is generated, a load button portion 610 from which load button 306 is generated, and a save button portion 612 from which save button 304 is generated. JavaScript function 606 is invoked when the user actuates the load button 306, as indicated by the line 614. In a similar manner, the JavaScript function in the frameset document 902 for saving user data is invoked when the user actuates the save button 306, as indicated by the line 616.

Figure 7:
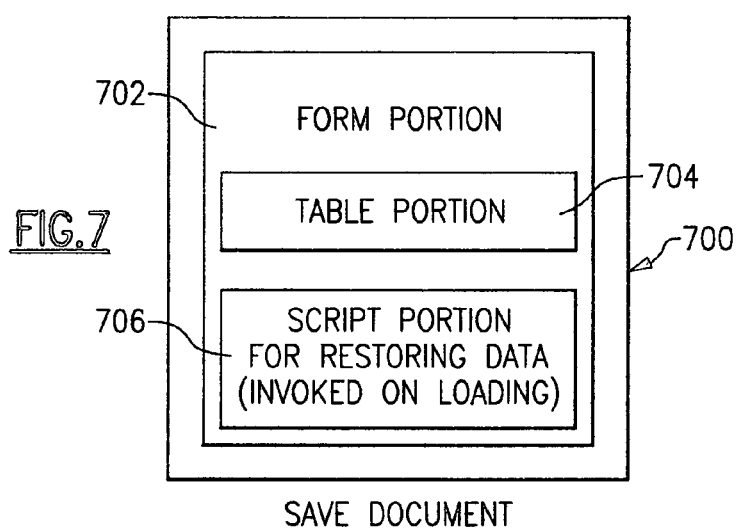
FIG. 7 shows the structure of the source version of the save window shown in FIG. 4.

FIG. 7 shows the general structure of the HTML source file 700 (alternatively, the "save" file or the "save" page) that is displayed as the save window 400. In contrast to the preexisting documents 902–908 that make up the Web application 900, save file 700 is dynamically generated by the script function 912 in the head portion 910 of frameset document 902 when the user actuates the save button 304 in the data entry window 300. As shown in the figure, the source file 700 contains a form portion 702 that contains a table portion 704 and a script portion 706. Table portion 704 contains an HTML encoding of the displayed text message 402, while script portion 706 contains a script function for restoring the saved data to the data entry page 300. Script portion 706 is invoked when the file 700 is loaded from the client data area 110 on user actuation of the load link 508.

Figure 8:
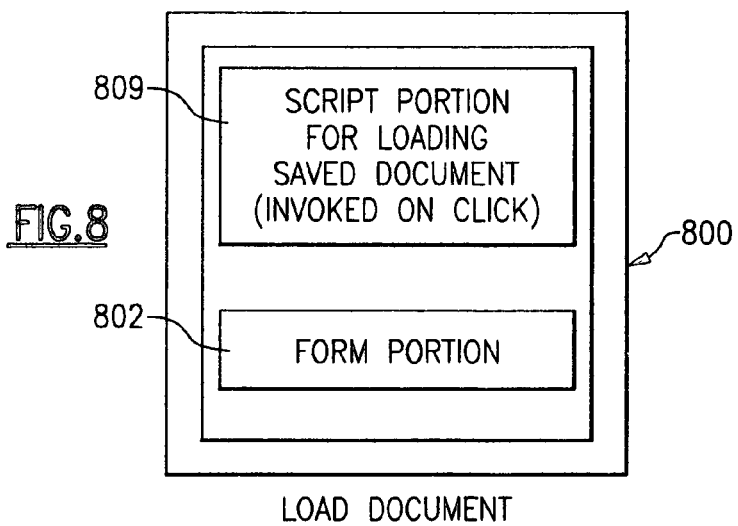
FIG. 8 shows the structure of the source version of the load window shown in FIG. 5.

FIG. 8 shows the general structure of the load page 908 that is displayed as the load window 500. As shown in the figure, load page 908 contains a form portion 802 that generates the displayed elements 502–508 and a script portion 804 that opens the save file 700 containing the locally saved user data in response to user actuation of the reload link 508 in load window 500.

Appendix A shows the JavaScript function saveToDisk( ) that is invoked when the user actuates the save button 304 in window 300. This function, which resides in script portion 912 of frameset document 902, dynamically creates the save file 700 (FIG. 7), which is saved by the user locally (e.g., to disk) as an HTML file in user data 110. More particularly, as shown in this listing, the function saveToDisk( ) opens a new window (line 4), writes individual lines of data from the header document 904 to the HTML file 700 defining the window (lines 6–48), and then closes the data stream to allow the newly generated window to be displayed as window 400 (line 49). Upon being reopened, this HTML file 700 repopulates the header document 904 of the Web application 900 with previously entered data, thus providing multi-session data persistence for a client-side Web application.

In Appendix A, the terms listed below have the following meaning:

'arrayList[ ]': An array in the header file 904 that contains the names of all other arrays in the file. This provides a way to add more arrays in the application without modifying this function to look for each individual array.

'url': Page currently on when this function is called (xxxxx.html). This provides a way to renter the application at the point of saving.

'toolDescription': One-line text description of tool ("My Web Application")

Appendix B is a listing of other JavaScript functions in the script portion 912 of the frameset document 902. Lines 51–55 of this listing contain the JavaScript function set (field,newdata), which repopulates fields of the header document 904 with new data from the save document 700 when the save document 700 is loaded. This function is invoked by the JavaScript function saveFields( ) in the save document 700 through its statements of the form opener.parent.set( . . . ) shown as lines 339–477 in Appendix D. Lines 60–66 of this listing contain the JavaScript function get(name), which retrieves the value of the field whose name is supplied as an input.

Appendix C is an HTML source listing of the base frame document 906 shown in FIGS. 6 and 9. Lines 79–142 of this listing (delimited by the tags <SCRIPT . . . > and </SCRIPT>) contain script portion 602, which in turn contains the script function 606, loadFromDisk( ), for opening load document 908 (lines 117–123). Lines 150–262 of this listing contain form portion 604 (delimited by the tags <FORM . . . > and </FORM>), which in turn contains build button portion 608 (line 254), load button portion 610 and save button portion 612 (line 256).

As noted above, and as indicated by the onClick="loadFromDisk( );" attribute in line 256, actuation of the load button invokes the JavaScript function loadFromDisk( ) on lines 117–123. On the other hand, as indicated by the on Click=parent.saveToDisk("interviews/ps_topics.html") attribute in line 256, actuation of the save button invokes the JavaScript function saveToDisk( ) that is contained in the script portion 912 of the frameset document 902 and is reproduced in Appendix A.

Appendix D is an HTML source listing of the save file 700 shown in FIG. 7. Lines 302–497 of this listing (delimited by the tags <FORM . . . > and </FORM>) contain the form portion 702 Form portion 702 contains the table portion 704 (lines 303–332) for generating the displayed text message, as well as the script portion 706 (lines 336–496) delimited by the tags <SCRIPT . . . > and </SCRIPT> for restoring the saved data to the data entry page 300. Script portion 706 contains the script function saveFields( ) (lines 338–493), which is invoked when the page is loaded, as indicated by the onLoad="saveFields" attribute in line 301. On being invoked, the script function saveFields( ) repopulates header document 904, corresponding to the header portion 300a of the data entry page 300, with the previously saved data. As can be seen from scanning the lines of the function saveFields( ), the data to be restored is embedded in the script function itself as the second argument of the various lines.

Appendix E is an HTML source listing of the load document 908 shown in FIGS. 8 and 9. Lines 521–526 of this listing (delimited by the tags <FORM . . . > and </FORM>) contain the form portion 802 for generating displayed elements 502–508. Lines 511–516 of this listing (delimited by the tags <SCRIPT> and </SCRIPT>) contain the script portion 804 for opening the saved page 400. The JavaScript function setlink( ) (lines 512–515) contained in script portion 804 is invoked when the user clicks on the reload link 508 (line 525), as indicated by the on Click=setlink( ) attribute in line 522.

Appendix F is an HTML listing for the header document 904 shown in FIG. 9.

While a particular embodiment has been shown and described, various modifications will be apparent to those skilled in the art. Thus, while the Web documents generated in the preferred embodiment use the HTML markup language, the invention is not restricted to any particular markup language. Also, while the Web documents generated in the preferred embodiment use JavaScript functions to provide the desired functionality, other scripting languages supported by the Web browser could be used instead.

What is claimed is:

1. In an information handling system in which a client application displays a first hypertext document to a user for entry of user data, said client application having a function for locally saving displayed documents, a method of providing local data persistence for said client application, said method being performed by said client application and comprising the steps of:
 receiving user data from said user;
 receiving a save command from said user to save said user data; and
 in response to receiving said save command, dynamically creating a new hypertext document containing said user data and displaying a message prompting the user to save the new document using said function for locally saving displayed documents, said new hypertext document containing a script function that becomes active when said new hypertext document is loaded to perform a desired restoration function.

2. The method of claim 1 in which said client application receives said first hypertext document from a server application.

3. The method of claim 1 in which said hypertext documents are HTML documents.

4. The method of claim 1 in which said message is created as a part of said new hypertext document.

5. The method of claim 1, comprising the further step of:
 receiving a restore command from said user to restore previously saved user data; and
 in response to receiving said restore command, repopulating said first document with said previously saved user data.

6. The method of claim 1 in which said script function is a JavaScript function.

7. The method of claim 1 in which said script function becomes active when loaded to repopulate the first hypertext document with said user data.

8. In an information handling system in which a client application displays a first hypertext document to a user for entry of user data, said client application having a function for locally saving displayed documents, apparatus for providing local data persistence for said client application, said apparatus being associated with said client application and comprising:
 means for receiving user data from said user;
 means for receiving a save command from said user to save said user data; and
 means responsive to receiving said save command for dynamically creating a new hypertext document containing said user data and displaying a message prompting the user to save the new document using said function for locally saving displayed documents, said new hypertext document containing a script function that becomes active when said new hypertext document is loaded to perform a desired restoration function.

9. The apparatus of claim 8 in which said message is created as a part of said new hypertext document.

10. The apparatus of claim 8, further comprising:
 means for receiving a restore command from said user to restore previously saved user data; and
 means responsive to receiving said restore command for repopulating said first document with said previously saved user data.

11. The apparatus of claim 8 in which said script function is a JavaScript function.

12. The apparatus of claim 8 in which said script function becomes active when loaded to repopulate the first hypertext document with said user data.

13. A program storage device readable by a machine, tangibly embodying a program of instructions executable by the machine to perform method steps for providing local data persistence for a client application in an information handling system in which a client application displays a first hypertext document to a user for entry of user data, said client application having a function for locally saving displayed documents, said method steps comprising:
 receiving user data from said user;
 receiving a save command from said user to save said user data; and
 in response to receiving said save command, dynamically creating a new hypertext document containing said user data and displaying a message prompting the user to save the new document using said function for locally saving displayed documents, said new hypertext document containing a script function that becomes active when said new hypertext document is loaded to perform a desired restoration function.

14. The program storage device of claim 13 in which said message is created as a part of said new hypertext document.

15. The program storage device of claim 13, comprising the further step of:

receiving a restore command from said user to restore previously saved user data; and in response to receiving said restore command, repopulating said first document with said previously saved user data.

16. The program storage device of claim 13 in which said script function is a JavaScript function.

17. The program storage device of claim 13 in which said script function becomes active when loaded to repopulate the first hypertext document with said user data.

* * * * *